US009809736B2

(12) United States Patent
Murphy et al.

(10) Patent No.: US 9,809,736 B2
(45) Date of Patent: Nov. 7, 2017

(54) WELLBORE SERVICING COMPOSITIONS AND METHODS OF MAKING AND USING SAME

(75) Inventors: Robert J. Murphy, Kingwood, TX (US); Matthew L. Miller, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 384 days.

(21) Appl. No.: 13/601,365

(22) Filed: Aug. 31, 2012

(65) Prior Publication Data

US 2014/0060843 A1 Mar. 6, 2014

(51) Int. Cl.
| | |
|---|---|
| C09K 8/03 | (2006.01) |
| C09K 8/512 | (2006.01) |
| C09K 8/516 | (2006.01) |
| C09K 8/68 | (2006.01) |
| E21B 21/00 | (2006.01) |

(52) U.S. Cl.
CPC ............... *C09K 8/03* (2013.01); *C09K 8/512* (2013.01); *C09K 8/516* (2013.01); *C09K 8/685* (2013.01); *E21B 21/003* (2013.01); *C09K 2208/04* (2013.01)

(58) Field of Classification Search
CPC .......... C04B 14/386; C09K 8/035; C09K 8/82
USPC ....................................................... 166/310
See application file for complete search history.

(56) References Cited

U.S. PATENT DOCUMENTS

| | | | |
|---|---|---|---|
| 4,526,240 A | 7/1985 | McKinley et al. | |
| 4,704,213 A | 11/1987 | Delhommer et al. | |
| 4,914,170 A | 4/1990 | Chang et al. | |
| 5,293,938 A | 3/1994 | Onan et al. | |
| 5,373,901 A | 12/1994 | Norman et al. | |
| 5,688,844 A | 11/1997 | Chatterji et al. | |
| 5,888,943 A | 3/1999 | Diggs et al. | |
| 5,913,364 A | 6/1999 | Sweatman | |
| 6,167,967 B1 | 1/2001 | Sweatman | |
| 6,209,646 B1 | 4/2001 | Reddy et al. | |
| 6,258,757 B1 | 7/2001 | Sweatman et al. | |
| 6,527,051 B1 | 3/2003 | Reddy et al. | |
| 6,554,071 B1 | 4/2003 | Reddy et al. | |
| 6,581,701 B2 | 6/2003 | Heying | |
| 6,861,392 B2 | 3/2005 | Shaarpour | |
| 6,902,002 B1 | 6/2005 | Chatterji et al. | |
| 7,066,285 B2 | 6/2006 | Shaarpour | |
| 7,229,492 B2 | 6/2007 | Chatterji et al. | |
| 7,284,611 B2 | 10/2007 | Reddy et al. | |
| 7,488,705 B2 | 2/2009 | Reddy et al. | |
| 7,534,744 B2 | 5/2009 | Shaarpour | |
| 7,607,482 B2 | 10/2009 | Roddy et al. | |
| 7,607,484 B2 | 10/2009 | Roddy et al. | |
| 7,612,021 B2 | 11/2009 | Chatterji et al. | |
| 7,617,870 B1 | 11/2009 | Roddy et al. | |
| 7,631,697 B2 | 12/2009 | Bhavsar | |
| 7,776,797 B2 * | 8/2010 | Allin | C09K 8/512 166/281 |
| 7,870,903 B2 | 1/2011 | Fang et al. | |
| 7,891,424 B2 * | 2/2011 | Creel | E21B 27/02 166/286 |
| 7,927,419 B2 | 4/2011 | Roddy et al. | |
| 7,934,554 B2 | 5/2011 | Roddy | |
| 8,030,253 B2 | 10/2011 | Roddy et al. | |
| 8,043,997 B2 | 10/2011 | Whitfill et al. | |
| 2002/0040812 A1 | 4/2002 | Heying | |
| 2006/0213662 A1 | 9/2006 | Creel et al. | |
| 2008/0125335 A1 | 5/2008 | Bhavsar | |
| 2009/0176667 A1 * | 7/2009 | Nguyen | C09K 8/70 507/204 |
| 2010/0193244 A1 | 8/2010 | Hoskins | |
| 2011/0160096 A1 * | 6/2011 | Roddy | G06F 19/366 507/100 |
| 2014/0060843 A1 | 3/2014 | Murphy et al. | |

FOREIGN PATENT DOCUMENTS

| | | |
|---|---|---|
| CA | 2769839 | 9/2012 |
| EP | 2890757 A1 | 7/2015 |
| WO | 2007083144 A1 | 7/2007 |
| WO | WO 2014/035810 A1 | 3/2014 |

OTHER PUBLICATIONS

Foreign communication from a related counterpart application—International Search Report and Written Opinion, PCT/US2013/056352, dated Oct. 9, 2013, 11 pages.
Abbasy, Imran, et al., "Laboratory Evaluation of Water-Swellable Materials for Fracture Shutoff," SPE 113193, Apr. 2008, pp. 1-14, Society of Petroleum Engineers.
Chatterji, J., et al., "Applications of Water-Soluble Polymers in the Oil Field," Journal of Petroleum Technology, Nov. 1981, pp. 2042-2056, Society of Petroleum Engineers.
Halliburton Material Safety Data Sheet entitled "Diamond Seal," Jan. 2, 2007, pp. 1-5, Halliburton.
Savari, Sharath, et al., "Resilient Lost Circulation Material (LCM): A Significant Factor in Effective Wellbore Strengthening," SPE 153154, Jun. 2012, pp. 1-7, Society of Petroleum Engineers.
Examination Report issued by the Australian Patent Office for Australian Patent Application No. 2013309200 dated Apr. 11, 2016. (2 pages).
Examination Report issued by the European Patent Office for European Patent Application No. 13753800.5 dated Feb. 23, 2016. (6 pages).
Examination Report for Canadian Patent Application No. 2,882,957, prepared by the Canadian Intellectual Property Office dated May 2, 2016. (4 pages).
International Preliminary Report on Patentability for International Application No. PCT/US2013/056352 dated Mar. 3, 2015. (8 pages).
Examination Report issued by the Canadian Patent Office for Canadian Patent Application No. 2,882,957 dated Dec. 2, 2016. (3 pages).

\* cited by examiner

*Primary Examiner* — Doug Hutton, Jr.
*Assistant Examiner* — Ashish Varma
(74) *Attorney, Agent, or Firm* — Haynes and Boone, LLP

(57) ABSTRACT

A method of servicing a wellbore in a subterranean formation comprising placing a wellbore servicing fluid comprising a lost-circulation composite material into a wellbore, wherein the lost-circulation composite material comprises a swellable component and a reinforcing component. A wellbore servicing fluid comprising a reinforcing component disposed within a swellable component wherein the swellable component comprises a crosslinked polymer.

18 Claims, No Drawings

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

This disclosure relates to methods of servicing a wellbore. More specifically, it relates to methods of treating lost circulation.

Background

Natural resources such as gas, oil, and water residing in a subterranean formation or zone are usually recovered by drilling a wellbore down to the subterranean formation while circulating a drilling fluid in the wellbore, which may be circulated downward through the interior of the drill pipe, out the drill bit, and upward through an annulus between the drill pipe and the wellbore wall. After termination of drilling operations, a string of pipe, e.g., casing, may be run in the wellbore. Circulation of drilling fluid may be resumed downward through the interior of the casing and upward through an annulus between the casing and the wellbore wall. Next, primary cementing is typically performed whereby a cement slurry is placed in the casing-wellbore annulus and permitted to set into a hard mass (i.e., sheath) to thereby attach the string of pipe to the walls of the wellbore and seal the annulus. Subsequent secondary cementing operations may also be performed.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore or otherwise placing fluids in the wellbore. In particular, the fluids may enter and be "lost" to the subterranean formation via lost circulation zones (LCZs) for example, depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation during drilling operations, resulting in the circulation of the fluid in the wellbore being terminated and/or too low to allow for further drilling of the wellbore. Such conditions may be referred to as partial or complete loss of circulation or lost circulation. Also, a secondary cement/sealant composition may be lost to the formation as it is being placed in the wellbore, thereby rendering the secondary operation ineffective in maintaining isolation of the formation. Conventional solutions to preventing loss of wellbore fluids to an LCZ involve forming a viscous mass in the LCZ. This may be accomplished by mixing a relatively small volume of slurry or "pill" made up of insoluble swellable particles in a water-based fluid and pumping the pill into the wellbore to spot it, or place it, at the LCZ, where the particles swell to form a viscous aggregate mass that obstructs the LCZ. The slurry pill may contain inhibitors, such as salts, that slow the swelling of the swellable particles in the pill to prevent premature swelling which could plug the conduit to the LCZ. Frequently, the viscous masses are easily deformable and may breakdown under fluid pressure, thereby allowing reestablishment of a fluid flow channel within the LCZ. Accordingly, an ongoing need exists for more effective compositions and methods of blocking the flow of fluid through LCZs in subterranean formations.

SUMMARY

Disclosed herein is a method of servicing a wellbore in a subterranean formation comprising placing a wellbore servicing fluid comprising a lost-circulation composite material into a wellbore, wherein the lost-circulation composite material comprises a swellable component and a reinforcing component.

Also disclosed herein is a wellbore servicing fluid comprising a reinforcing component disposed within a swellable component wherein the swellable component comprises a crosslinked polymer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are two component systems for the treatment of lost circulation and methods of using same. In an embodiment, the first component is a swellable component and the second component is a reinforcing component. The swellable component and reinforcing component may be contacted under conditions sufficient to form a composite material for treatment of lost circulation, herein designated a lost circulation composite material (LCCM). It is to be understood that the components represent functionalities in the LCCM such that the swellable component may be a mixture of materials that perform the function of the swellable component while the reinforcing component may be a mixture of materials that perform the function of the reinforcing component. The LCCM may be included in a wellbore servicing fluid (WSF) and when placed in a subterranean formation may modify the permeability of at least a portion of a formation in a manner that facilitates wellbore servicing operations. In some embodiments, the WSF forms a filtercake on a surface of the formation, wherein the filtercake comprises the LCCM.

In an embodiment, the swellable component and reinforcing component are configured in any manner suitable for the formation of an LCCM. For example, the swellable component may engulf, embed, envelop, confine, surround, encompass, or otherwise retain the reinforcing component. In an embodiment, the reinforcing component may be dispersed throughout the swellable component, contained within a portion of the swellable component, at least partially entangled or entwined with the swellable component, or otherwise associated with the swellable component such that the reinforcing component and swellable component form a composite. In an embodiment, the reinforcing component is disposed within the swellable component such that the entirety of the dimensions of the reinforcing component lies within the dimensions of the swellable component. Alternatively, the reinforcing component replaces some portion of the material typically found within the swellable component.

In an embodiment, the LCCM comprises a swellable component. The swellable component may comprise any material which can be assembled to form a structure with which the reinforcing component is associated (e.g., disposed within) and is swellable in the presence of a liquid. Herein the term "swellable" refers to the ability of the material to increase its volume and/or mass when in contact with a liquid.

Swellable components suitable for use in the present disclosure may be characterized by an absorption capacity of from about 1 times to about 1000 times their original weight (i.e., before swelling), alternatively from about 4 times to about 800 times, or alternatively from about 10 times to about 400 times. The swell time of the swellable component may range from about 1 second to about 48 hours, alternatively from about 5 seconds to about 5 hours, alternatively from about 30 seconds to about 3 hours, or alternatively about 2 hours where the swell time refers to the time for the particles to reach their maximum absorption capacity (e.g., fully saturated particles). In an embodiment, the swellable component comprises a water-swellable material (WSM), an oil-swellable material (OSM), or combinations thereof.

In an embodiment, the swellable component comprises a WSM. WSMs suitable for use in this disclosure include without limitation water-swellable polymers. A water-swellable polymer refers to any polymer that is capable of absorbing an aqueous fluid (e.g., water) and swelling, e.g., increasing in size as it absorbs the aqueous fluid. Nonlimiting examples of water-swellable polymers suitable for use with the methods of this disclosure include synthetic polymers, superabsorbers, natural polymers, or combinations thereof.

Nonlimiting examples of synthetic polymers suitable for use in the present disclosure include crosslinked polyacrylamide, polyacrylate, or combinations thereof.

In an embodiment, the water-swellable polymer comprises a superabsorber. Superabsorbers are commonly used in absorbent products such as horticulture products, wipe and spill control agents, wire and cable water-blocking agents, ice shipping packs, diapers, training pants, feminine care products, and a multitude of industrial uses. Superabsorbers are swellable, crosslinked polymers that have the ability to absorb and store many times their own weight of aqueous liquids. Superabsorbers retain the liquid that they absorb and typically do not release the absorbed liquid, even under pressure. Examples of superabsorbers suitable for use in the present disclosure include but are not limited to sodium acrylate-based polymers having three dimensional, network-like molecular structures. Without wishing to be limited by theory, the polymer chains are formed by the reaction/joining of hundreds of thousands to millions of identical units of acrylic acid monomers, which have been substantially neutralized with sodium hydroxide (caustic soda). Further, without wishing to be limited by theory, the crosslinking chemicals tie the chains together to form a three-dimensional network, which enable the superabsorbers to absorb water or water-based solutions into the spaces in the molecular network and thus form a gel that locks up the liquid. Additional nonlimiting examples of superabsorbers suitable for use in the present disclosure include crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonates, 2-acrylamido-2-methyl-1-propanesulfonic acid, 3-allyloxy-2-hydroxy-1-propane-sulfonic acid, acrylamide, acrylic acid monomers; or combinations thereof. In an embodiment, the water swellable polymer comprises a crosslinked polyacrylamide and/or polyacrylate.

Other nonlimiting examples of water-swellable polymers suitable for use in this disclosure include pre-crosslinked dry polymers such as hydroxylethyl cellulose (HEC), DIAMOND SEAL lost circulation material, CRYSTALSEAL agent, and AD200 polymer. DIAMOND SEAL lost circulation material and CRYSTALSEAL agent are water-swellable synthetic polymers commercially available from Halliburton Energy Services. AD 200 polymer is a water-swellable synthetic polymer commercially available from Hychem, Inc.

Nonlimiting examples of natural polymers suitable for use in the present disclosure include polysaccharides; lignosulfonates; chitins; chitosans; proteins; proteinous materials; fatty alcohols; fatty esters; fatty acid salts; aliphatic polyesters; poly(lactides); poly(glycolides), poly(amino acids); poly(aspartic acid) or combinations thereof.

In an embodiment, the WSM has a particle size (i.e., diameter) in the range of from about 0.01 microns to about 10000 microns, alternatively from about 0.1 microns to about 4000 microns, alternatively from about 0.5 microns to about 500 microns, alternatively from about 1 micron to about 100 microns, alternatively from about 1 micron to about 10 microns, or alternatively from about 1 micron to about 3 microns, before it absorbs water (i.e., in its solid form).

In an embodiment, the swellable component comprises an OSM. As used herein, a material is characterized as oil-swellable when it swells upon contact with an oleaginous or oil-based fluid. Examples of the oleaginous fluids include without limitation olefins, internal olefin based oils, mineral oil, kerosene, diesel oil, fuel oil, synthetic oil, linear or branched paraffins, esters, acetals, crude oil or mixtures thereof, hydrocarbons (e.g., natural-occurring, subterranean hydrocarbons) derivatives thereof, or combinations thereof.

In an embodiment, the OSM comprises an oil-swellable elastomer. Nonlimiting examples of oil-swellable elastomers suitable for use in the present disclosure include natural rubber, acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene copolymer rubber, styrene butadiene block copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, poly 2,2,1-bicyclo heptene (polynorborneane), alkylstyrene, crosslinked vinyl acrylate copolymers, or combinations thereof. One example of an oil-swellable elastomer suitable for use in the present disclosure is a styrene butadiene rubber.

In an embodiment, the OSM has a particle size (i.e., diameter) in the range of from about 5 microns to about 2000 microns, alternatively from about 20 microns to about 1500 microns, or alternatively from about 50 microns to about 1000 microns before it absorbs oil (i.e., in its solid form).

In an embodiment, the LCCM comprises a reinforcing component. A reinforcing component suitable for use in the present disclosure may be characterized by a tensile strength in the range of from about 1 MPa to about 100,000 MPa, alternatively from about 1 MPa to about 7500 MPa, alternatively from about 1 MPa to about 50000 Mpa, alternatively from about 1 MPa to about 25000 Mpa, alternatively from about 5 MPa to about 10000 MPa alternatively from about 5 MPa to about 7000 MPa, alternatively from about 1000 MPa to about 6000 MPa, alternatively from about 500 MPa to about 5000 MPa, alternatively from about 350 MPa to about 3000 MPa, or alternatively from about 500 MPa to about 2000 MPa. Tensile strength is defined herein as the maximum longitudinal stress a material can withstand before tearing, and is commonly expressed in MPa (i.e., 1 MPa=$1 \times 10^6$ Pa). Typically the tensile strength is envisioned as the forces required to pull apart a material composition.

Nonlimiting examples of reinforcing components suitable for use in this disclosure include shells of nuts such as walnuts, pecans, almonds, ivory nuts, brazil nuts, and the like; seed shells of seeds of fruits, plums, peaches, cherries, apricots, and the like; seed shells of other plants (e.g., maize, corn cobs or corn kernels); crushed fruit pits or processed wood materials, materials derived from woods, oak, hickory, walnut, poplar, mahogany, and the like; carbon fibers; carbon particulates; carbon nanotubes; graphene; carbon fiber composites; glass fibers; glass fiber composites; ceramic fibers; natural processed fibers such as cotton, wool, silk, hemp, linen, jute, sisal; metal fibers; metal alloy fibers; mineral fibers, mineral flakes, plastic fibers, thermoplastic fibers, polymeric elastomers, rubbers, latexes, and the like, or any combination thereof. Nonlimiting examples of plastic fibers suitable for use in the present disclosure include polypropylene; polyethylene; high-density polyethylene; polyethylene terephthalate; aramids (e.g., KEVLAR); Nylon 6,6; Rayon; polyvinyl alcohol fibers or combinations thereof.

In an embodiment, the reinforcing component is an elastomeric polymer comprising polyisoprene, polybutadiene, polyisobutylene, polyethers, polyesters, or combinations thereof. Alternatively, the reinforcing component is any polymer that is normally regarded as thermoplastic as for example and without limitation polystyrene, poly(methacrylate), isotactic polypropylene, polyurethane, or combinations thereof. Alternatively, the reinforcing component may be a copolymer formed by combinations of monomers used in production of the aforementioned materials.

In an embodiment, the reinforcing component is a thermoplastic elastomer having a thermostability in the temperature range of from about 30° F. to about 500° F. Nonlimiting examples of thermoplastic elastomers suitable for use in the present disclosure are the materials sold as FINAPRENE 411, FINAPRENE 435, FINAPRENE 401 and FINACLEAR by Total Petrochemical USA, Inc. or as KRATON products by Kraton Polymers.

Additional nonlimiting examples of suitable reinforcing component rubbers include natural rubber (cis-1,4-polyisoprene) and most of its modified types; synthetic polymers including styrene/butadiene rubber; cis-1,4-polybutadiene rubber or blends thereof with natural rubber or styrene/butadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber and polysulfide rubber. Such rubbers may be used either in the vulcanized or unvulcanized form.

Other copolymers that can be employed as reinforcing components in the present disclosure include without limitation block copolymers of various olefins as for example ethylene/propylene copolymers wherein the ethylene block segments are generally considered elastomeric in nature and the polypropylene segments are generally considered semi-crystalline. Additional disclosure regarding elastomers and rubber compositions suitable for use as reinforcing components is provided in U.S. Pat. Nos. 5,688,844 and 5,293,938, each of which is incorporated by reference herein in its entirety.

The reinforcing component utilized in the present disclosure may be of any shape and/or size compatible with the compositions and methodologies disclosed herein. For example, the reinforcing component may be a particulate material having a well-defined physical shape as well as an irregular geometry such as the physical shape of fibers, platelets, shavings, flakes, ribbons, rods, strips, tapes, spheroids, beads, toroids, pellets, or tablets. In an embodiment, the shape of the reinforcing component may be chosen so as to facilitate formation of the LCCM. For example, the reinforcing component may be a material that has branches, coils and/or kinks such that the reinforcing component to some extent becomes entangled with the swellable component and/or each other. Such entanglements may facilitate the formation and maintenance of the LCCM.

In some embodiments, the reinforcing component particle may have a particle size in the range of from about 0.01 microns to about 15,000 microns, alternatively from about 1 micron to about 4000 microns, or alternatively from about 20 microns to about 1000 microns.

In an embodiment, the swellable component and the reinforcing component are each present in amounts effective to generate a LCCM of the type disclosed herein. Thus, the amount of swellable component may range from about 1 weight percent (wt. %) to about 99.99 wt. %, alternatively from about 10 wt. % to about 99.5 wt. %, or alternatively from about 20 wt. % to about 95 wt. %, based on the total weight of the LCCM, while the amount of reinforcing component may range from about 0.01 wt. % to about 99 wt. %, alternatively from about 0.5 wt. % to about 90 wt. %, or alternatively from about 5 wt. % to about 80 wt. %, based on the total weight of the LCCM.

Alternatively, the ratio of reinforcing component to swellable component present in the LCCM may range from about 1:1 to about 1:1000, alternatively from about 1:3 to about 1:100, or from about 1:5 to about 1:50 based on the volume of the components.

In an embodiment, a reinforcing component of the type disclosed herein is associated with a swellable component of the type disclosed herein using any suitable methodology.

In an embodiment an LCCM is formed when the swellable component is plasticized or melted by heating in an extruder. The melt of the swellable component may then be contacted and mixed thoroughly with the reinforcing component. Alternatively, the swellable component may be contacted with the reinforcing component prior to introduction of the mixture to the extruder (e.g., via bulk mixing), during the introduction of the swellable component to an extruder, or combinations thereof. In an embodiment, the swellable component, the reinforcing component, or both are subjected are formed into an LCCM by processes such as compounding, injection molding, compression molding, extrusion, extrusion molding, and/or melt extrusion.

In an embodiment, the swellable component comprises a polymer. In such an embodiment, the LCCM may be formed by polymerization and optionally crosslinking of the swellable component in the presence of the reinforcing component. For example the swellable component may be formed by polymerizing acrylamide in the presence of an optional crosslinker comprising methylene bis acrylamide and a reinforcing component comprising a polypropylene fiber.

In an embodiment, the swellable component comprises a preformed material such as for example a pre-crosslinked water-swellable polymer of the type previously described herein. In such embodiments, the LCCM composition may be formed by impregnation of the swellable component with a composition comprising the reinforcing component under conditions suitable for association of the reinforcing component with the swellable component. For example, the pre-crosslinked water-swellable polymer may be swollen in an aqueous solution (e.g., a suspension or dispersion) containing the reinforcing component such that the reinforcing component becomes associated with or disposed within the swollen polymer (i.e., swellable component).

In an embodiment, the swellable component comprises a water-swellable polymer which is first swollen in an aqueous solution to form a swollen polymer (e.g., a partially or completely saturated polymer). The reinforced component may then be added (e.g., dry mixed) to the pre-swollen polymer which can be crosslinked in the presence of a reinforcing component to form a LCCM composition.

In an embodiment, the LCCM is formed through association of the swellable component with the reinforcing component utilizing one or more of the aforementioned methodologies. The swellable component, reinforcing component, or both may be modified to promote formation of the LCCM. Any modification of the reinforcing component, swellable component, or both that promotes formation of the LCCM is contemplated. For example, the reinforcing component, the swellable component or both may be surface modified by subjecting the materials to corona treatment, plasma treatment, photochemical treatment, chemical treatment (e.g., halogenation, phosphate, epoxy treatment), chemical grafting (e.g., surface grafting by redox initiators), or combinations thereof.

Without wishing to be limited by theory, the components of the LCCM may be modified to improve the surface compatibility of the components. For example, if all surfaces for the involved materials are hydrophobic, the binding between those materials may be more durable than in the case where some surfaces are hydrophobic and some other surfaces involved in the binding of the materials are hydrophilic. Thus, a reinforcing component comprising a hydrophilic polymer (e.g., rayon fibers) would be expected to exhibit surface compatibility with a swellable component that is hydrophilic in nature (e.g., HEC) and their binding may be more durable. In an embodiment, rayon fibers may be surface treated (e.g., nanoscale hydrophobic treatment) and converted into hydrophobic rayon fibers that would exhibit surface affinity for a hydrophobic swellable component such as isoprene rubber. One of ordinary skill in the art, with the aid of this disclosure, would be able to match a reinforcing component and a swellable component based on surface compatibility with the purpose of assembling a LCCM.

In an embodiment the LCCM is present in the WSF in an amount of from about 0.5 pounds per barrel (ppb) to about 150 ppb, alternatively from about 1 ppb to about 80 ppb, alternatively from about 1.5 ppb to about 50 ppb.

LCCM particles of the type disclosed herein may be characterized by an absorption capacity of from about 1 times to about 1000 times their original weight, alternatively from about 4 times to about 500 times, or alternatively from about 5 times to about 300 times. The swell time of the LCCM particles may be in a range of from about 1 second to about 48 hours, alternatively from about 5 seconds to about 5 hours. In an embodiment, the swell time of the particles is greater than about 1 hour. In an embodiment, the swelling of the LCCM particles is adjusted to meet one or more user and/or process. For example, swelling of the LCCM may be adjusted by contact with a swelling inhibitor (e.g., salt).

In an embodiment, an LCCM comprises Nylon 6,6 fibers and a water-swellable polymer. The Nylon 6,6 fibers may have been subjected to corona plasma treatment prior to formation of the LCCM. A methodology for preparation of the LCCM may comprise contacting the corona-treated Nylon 6,6 fibers with the water-swellable polymer (e.g., dry-blending) to form a mixture that is melt-extruded to form the LCCM.

In an embodiment, the LCCM comprises rayon fibers and a cross-linked polyacrylamide. A methodology for preparation of the LCCM may comprise formation of the polyacrylamide polymer in the presence of the rayon fibers.

In an embodiment, the LCCM comprises a water-swellable polymer and a reinforcing component which are dry-mixed or dry-blended. In an embodiment, a method of preparing the LCCM may comprise swelling the water-swellable polymer in the presence of the reinforcing component to form the LCCM. The method may further comprise treating the LCCM to dehydrate the material and reduce the water-content of the LCCM prior to introduction of the LCCM to a WSF and/or lost circulation zone. Any suitable methodology may be employed to dehydrate the LCCM such as thermal treatments or contact with a chemical dehydrating agent. In an embodiment, the LCCM is dehydrated to form a composite material comprising from about 0 wt. % to about 10 wt. % water, alternatively from about 0 wt. % to about 5 wt. % water, and alternatively from about 0 wt. % to about 1 wt. % water.

In an embodiment, the LCCM is encapsulated prior to placement in a wellbore. For example, the LCCM may be prepared as described herein and subsequently spray-coated with an encapsulating material such that the LCCM when contacted with a WSF and during placement in a wellbore may exhibit a reduced absorption capacity when compared to the LCCM without an encapsulating material. Upon placement in a lost circulation zone the encapsulating material (external coating) may experience a decrease in structural integrity as a result of time and/or external stimuli (e.g., temperature, pH) such that it no longer inhibits the absorption capacity of the LCCM. Encapsulation and encapsulating materials are described in more detail in U.S. Pat. Nos. 5,373,901; 6,527,051; 6,554,071; and 6,209,646, which are incorporated by reference herein in their entirety.

In an embodiment, the LCCM comprises a swellable component, and a reinforcing component comprising a mixture of materials of the type disclosed herein. For example, the reinforcing component may comprise a particulate material (e.g., crushed nut shell) and a fibrous material (e.g., carbon fiber).

A LCCM of the type disclosed herein may be included in any suitable wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, lost circulation pills, spacer fluids, lost circulation fluids, fracturing fluids or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, an LCCM of the type disclosed herein is added to a wellbore servicing fluid. In an embodiment, the wellbore servicing fluid is an aqueous based fluid. In an embodiment, the wellbore servicing fluid is an oil-based fluid. In an embodiment the wellbore servicing fluid is a drilling fluid comprising an emulsion or an invert-emulsion.

In an embodiment, the wellbore servicing fluid comprises an oil-in-water emulsion fluid comprising a non-oleaginous (e.g., aqueous) continuous phase and an oleaginous discontinuous phase. In an embodiment, the wellbore servicing fluid comprises a water-in-oil emulsion fluid, termed an invert emulsion, comprising an oleaginous continuous phase and a non-oleaginous discontinuous phase. Examples of oleaginous fluids suitable for use in drilling fluids include, but are not limited to petroleum oils, natural oils, synthetically-derived oils, or combinations thereof. More particularly, examples of oleaginous fluids suitable for use in drilling fluids include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof. Any aqueous solution compatible with the other components of the wellbore servicing fluid may comprise the non-oleaginous phase. In an embodiment, the aqueous solution may generally comprise any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof.

The wellbore servicing fluid may comprise additional additives as deemed appropriate for improving the properties of the fluid. Such additives may vary depending on the intended use of the fluid in the wellbore. Examples of such additives include, but are not limited to, emulsifiers, lime, organic/inorganic viscosifiers, weighting agents, glass fibers, carbon fibers, suspending agents, conditioning agents, dispersants, water softeners, oxidation and corrosion inhibitors, thinners, acid gas scavengers and combinations thereof. These additives may be introduced singularly or in combination using any suitable methodology and in amounts effective to produce the desired improvements in fluid properties.

In an embodiment, the LCCMs may be introduced to the wellbore to prevent the loss of aqueous or non-aqueous drilling fluids into lost circulation zones such as voids, vugular zones, and natural or induced fractures while drilling. In an embodiment, the LCCMs may be introduced to prevent the loss or migration of fluid into lost circulation zones or undesirable flowpaths such as voids, vugular zones, and natural or induced fractures in the formation.

In an embodiment, a WSF comprising an LCCM of the type disclosed herein may be introduced into a wellbore where it may enter a lost circulation zone. Within the lost circulation zone the LCCM may contact fluids resulting in swelling of the swellable component and the formation of a low permeability mass that is effective for obstruction of one or more fluid flow paths within the lost circulation zone. In some embodiments, the LCCM mass has a relatively low permeability to fluids used to service a wellbore such as a drilling fluid, a fracturing fluid, a cement, an acidizing fluid, an injectant, and the like, thus creating a barrier to the flow of such fluids.

In an embodiment, the LCCM is placed into a wellbore as a single stream and activated by downhole conditions (e.g., undergoes swelling in the presence of formation water) to form a barrier that substantially seals a lost circulation zones or other undesirable flowpath. In such an embodiment, the LCCM may be placed downhole through the drill bit forming a composition that substantially eliminates the lost circulation. Methods for introducing compositions into a wellbore to seal subterranean zones are described in more detail in U.S. Pat. Nos. 5,913,364; 6,167,967; and 6,258,757, each of which is incorporated by reference herein in its entirety.

In an embodiment, the LCCM may be introduced into the wellbore, the formation, or a lost circulation zone as a single fluid based pill. As will be understood by those of ordinary skill in the art with the aid of this disclosure, introduction as a single fluid based pill may be an appropriate mode of introduction where it is intended for the swelling of the LCCM to be delayed, retarded, or otherwise controlled such that the LCCM will not swell until reaching a desired locale.

For example, the LCCM may comprise a water-swellable component. In such embodiments, swelling of the LCCM may be delayed by introduction of the material using a WSF comprising a brine. Brines are aqueous fluids that are typically saturated or nearly saturated with salt. In the presence of the brine, the absorption capacity of the LCCM is inhibited and swelling of the LCCM may delayed until the material is contacted with aqueous fluids (e.g., fresh water present in the lost circulation zone) having a reduced salt content.

In an embodiment, an LCCM of the type disclosed herein resists deformation and maintains a higher degree of structural integrity when compared to an otherwise identical swellable component lacking a reinforcing component.

In an embodiment, LCCMs of the type disclosed herein may advantageously decrease the permeability of the wellbore so as to mitigate the unwanted loss of fluids to the formation. The LCCMs of this disclosure display an increased mechanical strength that may advantageously reduce degradation of the material during handling and provide increased mechanical strength when placed in lost circulation zones.

The LCCMs of this disclosure may provide lost circulation control in a sufficiently short time period to prevent the operator from pulling out of the hole and thus reducing nonproductive rig time; various methods of introducing the LCCM, as described previously herein, may allow this to be accomplished. In an embodiment, the LCCM may swell or begin to swell instantaneously or substantially instantaneously upon entering a lost circulation zone. In an embodiment, the LCCMs are advantageously delivered into the wellbore in an encapsulated form.

LCCMs of the type disclosed herein may advantageously function as density-adjusting or weighting agents depending on the specific gravity of the reinforcing component. In an embodiment, the LCCM comprises a reinforcing component having a specific gravity greater than about 1. In such embodiments, the LCCM either alone or in conjunction with conventional weighting agents (e.g., barite, hematite) may be used to adjust the density of the WSF in which the LCCM is included to some user and/or process desired density.

In an embodiment, the wellbore servicing operations utilizing a LCCM of the type disclosed herein may be modeled to characterize various properties that may affect the operation. In an embodiment, the effect of the LCCM particle size and/or the rheological properties of a LCCM plug may be modeled. In an embodiment, an LCCM of the type disclosed herein is prepared as a slurry and designed so as to not obstruct flow pathways or wellbore servicing conduits during placement downhole. Disposal, recycle, and/or reuse of the LCCMs of this disclosure may be effected using methodologies comparable for to the disposal, recycle and/or reuse of a water-based or oil-based mud. As will be understood by one of ordinary skill in the art, cleanup of equipment contacted with an LCCM of the type disclosed herein may be carried out prior to introduction of a second fluid that would be incompatible with the LCCM. IN an embodiment, normal wellbore servicing operations (e.g., drilling) may be resumed after introduction of an LCCM of the type disclosed herein to a wellbore.

The exemplary LCCM disclosed herein may directly or indirectly affect one or more components or pieces of equipment associated with the preparation, delivery, recapture, recycling, reuse, and/or disposal of the disclosed LCCM. For example, the disclosed LCCM may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary LCCM. The disclosed LCCM may also directly or indirectly affect any transport or delivery equipment used to convey the LCCM to a well site or downhole such as, for example, any transport vessels, conduits, pipelines, trucks, tubulars, and/or pipes used to fluidically move the LCCM from one location to another, any pumps, compressors, or motors (e.g., topside or downhole) used to drive the LCCM into motion, any valves or related joints used to regulate the pressure or flow rate of the LCCM, and any sensors (i.e., pressure and temperature), gauges, and/or combinations thereof, and the like. The disclosed LCCM may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

ADDITIONAL DISCLOSURE

The following are nonlimiting, specific embodiments in accordance with the present disclosure:

A first embodiment, which is a method of servicing a wellbore in a subterranean formation comprising:

placing a wellbore servicing fluid comprising a lost-circulation composite material into a wellbore, wherein the lost-circulation composite material comprises a swellable component and a reinforcing component.

A second embodiment, which is the method of the first embodiment wherein the swellable component comprises a water-swellable material, an oil-swellable material or both.

A third embodiment, which is the method of any of the first through second embodiments wherein the water-swellable material comprises synthetic polymers, superabsorbers, natural polymers or combinations thereof.

A fourth embodiment, which is the method of the third embodiment wherein the superabsorber comprises crosslinked polyacrylamide; crosslinked polyacrylate; crosslinked hydrolyzed polyacrylonitrile; salts of carboxyalkyl starch, salts of carboxymethyl starch; salts of carboxyalkyl cellulose; hydroxyethyl cellulose; salts of crosslinked carboxyalkyl polysaccharide; crosslinked copolymers of acrylamide and acrylate monomers; starch grafted with acrylonitrile and acrylate monomers; crosslinked polymers of two or more of allylsulfonates, 2-acrylamido-2-methyl-1-propanesulfonic acid, 3-allyloxy-2-hydroxy-1-propane-sulfonic acid, acrylamide, acrylic acid monomers; or combinations thereof.

A fifth embodiment, which is the method of any of the first through fourth embodiments wherein the oil-swellable material comprises an oil-swellable elastomer.

A sixth embodiment, which is the method of the fifth embodiment wherein the oil-swellable elastomer comprises natural rubber, acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene copolymer rubber, styrene butadiene block copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, poly 2,2,1-bicyclo heptene (polynorborneane), alkylstyrene, crosslinked vinyl acrylate copolymers, or combinations thereof.

A seventh embodiment, which is the method of any of the first through sixth embodiments wherein the reinforcing component comprises shells of nuts, seed shells, fruit pits, processed wood materials, materials derived from woods, oak, carbon fibers, carbon particulates, carbon nanotubes, graphene, carbon fiber composites, glass fibers, glass fiber composites, ceramic fibers, natural processed fibers, cotton, wool, silk, hemp, linen, jute, sisal, metal fibers, metal alloy fibers, mineral fibers, mineral flakes, plastic fibers, thermoplastic fibers, polymeric elastomers, rubbers, latexes, and the like, or any combinations thereof.

An eighth embodiment, which is the method of the seventh embodiment wherein the plastic fibers comprise polypropylene; polyethylene; high density polyethylene, polyethylene terephthalate; aramids; Nylon 6,6; Rayon; polyvinyl alcohol fibers, or combinations thereof.

A ninth embodiment, which is the method of the seventh through eighth embodiments wherein the thermoplastic fibers comprise polystyrene, poly(methacrylate), isotactic polypropylene, polyurethane, or combinations thereof.

A tenth embodiment, which is the method of any of the seventh through ninth embodiments wherein the polymeric elastomer comprise polyisoprene, polybutadiene, polyisobutylene, polyethers, polyesters, or combinations thereof.

An eleventh embodiment, which is the method of any of the seventh through tenth embodiments wherein the rubber comprises natural rubber; synthetic polymers; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber, polysulfide rubber, or combinations thereof.

A twelfth embodiment, which is the method of any of the first through eleventh embodiments wherein the reinforcing component has a tensile strength of from about 1 MPa to about 100,000 MPa.

A thirteenth embodiment, which is the method of any of the first through twelfth embodiments wherein the ratio of reinforcing component to swellable component is from about 1:1 to about 1:1000.

A fourteenth embodiment, which is the method of any of the first through thirteenth embodiments wherein the lost-circulation composite material is present in the wellbore servicing fluid in an amount of from about 0.5 ppb to about 150 ppb.

A fifteenth embodiment, which is the method of any of the first through fourteenth embodiments wherein the reinforcing component, swellable component or both are surface-modified prior to introduction to the wellbore servicing fluid.

A sixteenth embodiment, which is the method of any of the first through fifteenth embodiments wherein the lost-circulation composite material is prepared by melt extrusion of a mixture of the reinforcing component and swellable component.

A seventeenth embodiment, which is the method of any of the first through sixteenth embodiments wherein the lost-circulation composite material is prepared by polymerization of the swellable component in the presence of the reinforcing component.

An eighteenth embodiment, which is the method of any of the first through seventeenth embodiments wherein the lost-circulation composite material is encapsulated.

A nineteenth embodiment, which is the method of any of the first through eighteenth embodiments wherein the wellbore servicing fluid comprises a water-based drilling mud or an oil-based drilling mud.

A twentieth embodiment, which is a wellbore servicing fluid comprising:

a reinforcing component disposed within a swellable component wherein the swellable component comprises a crosslinked polymer.

A twenty-first embodiment, which is the fluid of twentieth embodiment wherein the crosslinked polymer comprises a water-swellable polymer.

A twenty-second embodiment, which is the fluid of any of the twentieth through twenty-first embodiment wherein the reinforcing component comprises carbon fibers, carbon fiber composites, glass fibers, glass fiber composites, metal fibers, metal alloy fibers, minerals fibers, mineral flakes, plastic fibers, thermoplastic fibers, polymeric elastomers, rubbers, latexes, cotton fibers, wool fibers, or combinations thereof.

A twenty-third embodiment, which is the fluid of any of the twentieth through twenty-second wherein the swellable component comprises a superabsorber and the reinforcing component comprises a carbon fiber.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore servicing fluid comprising:
   a lost-circulation composite material comprising a reinforcing component disposed within a water-swellable component, wherein the water-swellable component comprises a superabsorber,
   wherein the superabsorber is selected from the group consisting of crosslinked hydrolyzed polyacrylonitrile; hydroxyethyl cellulose; crosslinked polymers of two or more of allylsulfonates; 2-acrylamido-2-methyl-1-propanesulfonic acid; 3-allyloxy-2-hydroxy-1-propane-sulfonic acid; and combinations thereof;
   wherein the reinforcing component is selected from the group consisting of cotton, wool, silk, hemp, linen, jute, sisal, and combinations thereof; and
   wherein the superabsorber, the reinforcing component, or both, are corona treated, plasma treated, photochemically treated, or any combination thereof, to promote formation of the lost-circulation composite material.

2. The fluid of claim 1, wherein the reinforcing component has a tensile strength of from about 1 MPa to about 100,000 MPa.

3. The fluid of claim 1, wherein a ratio of the reinforcing component to the water-swellable component is from about 1:1 to about 1:1000.

4. The fluid of claim 1, wherein the lost-circulation composite material is present in the wellbore servicing fluid in an amount of from about 0.5 ppb to about 150 ppb.

5. The fluid of claim 1, wherein the lost-circulation composite material is encapsulated.

6. A method of servicing a wellbore in a subterranean formation comprising:
   providing a reinforcing component and a swellable component comprising a superabsorber,
     wherein the superabsorber is selected from the group consisting of crosslinked hydrolyzed polyacrylonitrile; hydroxyethyl cellulose; crosslinked polymers of two or more of allylsulfonates; 2-acrylamido-2-methyl-1-propanesulfonic acid; 3-allyloxy-2-hydroxy-1-propane-sulfonic acid; and combinations thereof, and
     wherein the reinforcing component is selected from the group consisting of cotton, wool, silk, hemp, linen, jute, sisal, and combinations thereof;
   subjecting the superabsorber, the reinforcing component, or both, to corona treatment, plasma treatment, photochemical treatment, or combinations thereof;
   swelling the superabsorber in the presence of water and the reinforcing component to form a lost-circulation composite material;
   dehydrating the lost-circulation composite material;
   adding the dehydrated lost-circulation composite material to a wellbore servicing fluid; and
   placing the wellbore servicing fluid into the wellbore.

7. The method of claim 6 wherein the swellable component further comprises an oil-swellable material.

8. The method of claim 7 wherein the oil-swellable material comprises an oil-swellable elastomer.

9. The method of claim 8 wherein the oil-swellable elastomer comprises natural rubber, acrylate butadiene rubber, polyacrylate rubber, isoprene rubber, choloroprene rubber, butyl rubber, brominated butyl rubber, chlorinated butyl rubber, chlorinated polyethylene, neoprene rubber, styrene butadiene copolymer rubber, styrene butadiene block copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, poly 2,2,1-bicyclo heptene (polynorborneane), alkylstyrene, crosslinked vinyl acrylate copolymers, or combinations thereof.

10. The method of claim 6 wherein the reinforcing component has a tensile strength of from about 1 MPa to about 100,000 MPa.

11. The method of claim 6 wherein a ratio of the reinforcing component to the swellable component is from about 1:1 to about 1:1000.

12. The method of claim 6 wherein the lost-circulation composite material is present in the wellbore servicing fluid in an amount of from about 0.5 ppb to about 150 ppb.

13. The method of claim 6 wherein the reinforcing component, swellable component or both are surface-modified prior to introduction to the wellbore servicing fluid.

14. The method of claim 6 wherein the lost-circulation composite material is encapsulated.

15. The method of claim 6 wherein the wellbore servicing fluid comprises a water-based drilling mud or an oil-based drilling mud.

16. The method of claim 6, further comprising allowing the lost-circulation composite material to enter one or more lost circulation zones.

17. The method of claim 16, further comprising allowing the lost-circulation composite material to seal the one or more lost circulation zones.

18. The method of claim 6, further comprising allowing the lost-circulation composite material to form a filtercake on a surface of the formation.

* * * * *